(12) United States Patent
Looney et al.

(10) Patent No.: US 10,814,889 B2
(45) Date of Patent: Oct. 27, 2020

(54) MODULAR DRIVE TRAIN FOR RAILCAR MOVER

(71) Applicant: Trackmobile LLC, La Grange, GA (US)

(72) Inventors: Jeffrey Looney, Lagrange, GA (US); Robert Evans, Lagrange, GA (US)

(73) Assignee: Trackmobile LLC, La Grange, GA (US)

( * ) Notice: Subject to any disclaimer, the term of this patent is extended or adjusted under 35 U.S.C. 154(b) by 421 days.

(21) Appl. No.: 15/728,343

(22) Filed: Oct. 9, 2017

(65) Prior Publication Data
US 2019/0106125 A1 Apr. 11, 2019

(51) Int. Cl.
| | |
|---|---|
| *B61C 3/00* | (2006.01) |
| *B61L 27/04* | (2006.01) |
| *B61C 13/00* | (2006.01) |
| *B61C 9/38* | (2006.01) |
| *B61J 3/12* | (2006.01) |
| *B60L 15/20* | (2006.01) |

(52) U.S. Cl.
CPC ............ *B61C 3/00* (2013.01); *B60L 15/2036* (2013.01); *B61C 9/38* (2013.01); *B61C 13/00* (2013.01); *B61J 3/12* (2013.01); *B61L 27/04* (2013.01); *B61L 2201/00* (2013.01)

(58) Field of Classification Search
CPC ... B61C 3/00; B61C 11/00; B61C 9/38; B61L 27/04; B61J 3/12; B60L 15/2036
See application file for complete search history.

(56) References Cited

U.S. PATENT DOCUMENTS

| | | | | |
|---|---|---|---|---|
| 2,027,218 A | * | 1/1936 | Armington | ............... B61C 9/38 74/664 |
| 3,557,707 A | * | 1/1971 | Joy | .......................... B61B 13/00 105/53 |
| 5,553,684 A | * | 9/1996 | Bolduc | .................. B60W 30/18 180/321 |
| 9,088,197 B2 | * | 7/2015 | Nair | ....................... H02K 11/40 |

(Continued)

FOREIGN PATENT DOCUMENTS

| | | | |
|---|---|---|---|
| DE | 20 2008 008246 U1 | 8/2008 | |
| DE | 202008008246 U1 * | 8/2008 | .............. B60F 1/043 |

(Continued)

OTHER PUBLICATIONS

Jan. 31, 2019—(WO) ISR and WO—App. No. PCT/US2018/054853.

*Primary Examiner* — Scott A Browne
(74) *Attorney, Agent, or Firm* — Arnold & Porter Kaye Scholer LLP (57) ABSTRACT

A modular drive train assembly is disclosed for the rail wheels of a railcar mover that provides a plurality of electric drive motors. Each electric drive motor may be connected to a gearbox and subsequently connected to a rail wheel. An automated control system may further control the power supplied to each of the electric drive motors such that the power supplied to each electric drive motor may be individually controlled to enhance the traction of each rail wheel. In addition, a plurality of sensors may monitor and communicate information from the electric drive motors to allow the control system to automatically control the power to each of the electric drive motors to enhance traction of the railcar mover.

16 Claims, 6 Drawing Sheets

(56) References Cited

U.S. PATENT DOCUMENTS

| | | | |
|---|---|---|---|
| 2004/0015255 A1* | 1/2004 | Davis | B61C 3/00 700/97 |
| 2015/0224839 A1* | 8/2015 | Krols | B60F 1/043 105/72.2 |
| 2015/0306975 A1* | 10/2015 | Timan | B61B 13/04 105/49 |
| 2017/0043793 A1 | 2/2017 | Evans et al. | |

FOREIGN PATENT DOCUMENTS

| | | |
|---|---|---|
| EP | 0 919 447 A1 | 6/1999 |
| WO | 2014/032126 A1 | 3/2014 |

* cited by examiner

MODULAR DRIVE TRAIN FOR RAILCAR MOVER

FIELD OF INVENTION

The field of invention for this disclosure relates to a drive train for improving traction for railcar movers.

BACKGROUND

Railcar movers provide a more efficient way to move railcars around within a rail yard than using a locomotive for such tasks. Existing railcar movers have rigid axles with a differential locking feature that does not allow for varying the speed and torque to each rail wheel. When turning a vehicle that has locked axles, the rail wheels along the inside of the turn need to turn slower than the rail wheels along the outside of the turn wheels due to the difference of the inside turning radius and the outside turning radius. With rigid axles, energy is lost due to traction problems when the rail wheels along the inside turning radius try to maintain the same speed as the rail wheels along the outside turning radius. Traction can be lost due to these variances in railcar movers using conventional drive trains to drive the rail wheels that use an engine, transmission, drive lines, and axles or that use an engine, transmission, transfer case, drive lines, and axles. Means for controlling a conventional drive train efficiently is limited to the mechanical fixed constraints and losses that are inherent to this type of drive system, such as gearing losses for transmission of power through each individual gear. A drive train that can reduce the number of mechanical connections to transmit power to each rail wheel individually can increase the efficiency of the system.

SUMMARY

Aspects of this disclosure relate to a railcar mover that comprises a vehicle chassis, an electric drive assembly that comprises a frame secured to the vehicle chassis, where the frame includes a first end having a first mounting plate and a second end opposite the first end having a second mounting plate. A first electric drive motor may be connected to a first gearbox that is also connected to a first rail wheel, where the first rail wheel is positioned outboard the first mounting plate of the frame, and a second electric drive motor connected to a second gearbox that is connected to a second rail wheel, where the second rail wheel is positioned outboard of the second mounting plate of the frame. The second rail wheel may be substantially coaxial to the first rail wheel. The first electric drive motor and the second electric drive motor may be connected to a power source, where a first amount of power supplied to the first electric drive motor and a second amount of power supplied to the second electric drive motor are independently controlled such that the first amount of power is different than the second amount of power. The difference in the first amount of power and the second amount of power may cause the first rail wheel to rotate at a different speed than the second rail wheel. A portion of the first electric drive motor may be located inboard the first mounting plate of the frame, and a portion of the second electric drive motor may be located inboard of the second mounting plate of the frame. In addition, at least a portion of the first electric drive motor may extend through a first central opening in the first mounting plate of the frame, and a portion of the second electric drive motor may extend through a second central opening in the second mounting plate of the frame.

Additional aspects of this disclosure may relate to the railcar mover further comprising a controller connected to a power source, where the controller determines the first amount of power provided to the first electric drive motor and the second amount of power to the second electric drive motor. In addition, a first sensor may monitor and communicate a first measured electric current in the first electric drive motor to the controller, and a second sensor monitors and communicates a second measured electric current in the second electric drive motor to the controller. Also, a portion of the first gearbox may located within an inner diameter of the first rail wheel, and the first gearbox and the second gearbox may be planetary-type gearboxes.

Still other aspects of this disclosure may relate to a railcar mover comprising a vehicle chassis, a first electric drive assembly having a frame secured to the vehicle chassis, where the frame includes a first end with a first mounting plate and a second end opposite the first end with a second mounting plate. A first electric drive motor may be connected to a first gearbox that is connected to a first rail wheel, where the first rail wheel is positioned outboard the first mounting plate of the frame, a second electric drive motor connected to a second gearbox that is connected to a second rail wheel, where the second rail wheel is positioned outboard of the second mounting plate of the frame. The second rail wheel may be substantially coaxial to the first rail wheel. The railcar mover may further comprise a second electric drive assembly having a second frame secured to the vehicle chassis, where the second frame may include a first end having a first mounting plate and a second end opposite the first end having a second mounting plate with a third electric drive motor connected to a third gearbox that may be connected to a third rail wheel, where the third rail wheel may be positioned outboard the first mounting plate of the second frame, and a fourth electric drive motor connected to a fourth gearbox that is connected to a fourth rail wheel, where the fourth rail wheel may be positioned outboard of the second mounting plate of the second frame, where the fourth rail wheel may be substantially coaxial to the third rail wheel. Each of the electric drive motors may connect to a power source, where a first amount of power supplied from the power source to the first electric drive motor may be different from a second amount of power such that the first rail wheel rotates at a different speed than the second rail wheel. In addition, a third electric current may be supplied from the power source to the third electric drive motor may be different than a fourth electric current such that the third rail wheel rotates at a different speed than the fourth rail wheel.

In addition, this disclosure may relate to the railcar mover further comprising a controller connected to a power source, where the controller determines the first amount of power provided to the first electric drive motor and the second amount of power provided to the second electric drive motor. A first sensor may monitor and communicate a first set of predetermined measured parameters from the first electric drive motor to the controller and where a second sensor that may monitor and communicate a second set of predetermined measured parameters from the second electric drive motor to the controller. The first set of predetermined measured parameters may include a first measured electric current from the first electric drive motor, and the second set of predetermined measured parameters may include a second measured electric current in the second electric drive motor. Each of the electric drive motors may connect to a power inverter.

Yet other aspects of this disclosure may relate to a non-transitory computer readable medium storing computer readable instructions that, when executed by the controller, causes the controller to at least: acquire a joystick input position, calculate a target speed based upon the joystick input position, determine a target electric current for each of the electric drive motors, acquire a measured amount of electric current at each electric drive motor, and compare the measured amount of electric current at each electric motor to the target electric current for each electric drive motor. Upon determining that the measured amount of electric current at a selected electric drive motor of the plurality of electric drive motors is greater than the target electric current provided to the selected electric drive motor of the plurality of electric drive motors, the controller may reduce the target electric current directed to the selected electric drive motor. Alternatively, upon determining that the measured electric current is less than the target electric current for one of the electric drive motors, the controller may increase the target electric current for the one of the electric drive motors.

BRIEF DESCRIPTION OF THE DRAWINGS

The present invention is illustrated by way of example and not limited in the accompanying figures in which like reference numerals indicate similar elements and in which.

Further, it is to be understood that the drawings may represent the scale of different components of one single embodiment; however, the disclosed embodiments are not limited to that particular scale.

DETAILED DESCRIPTION

Aspects of this disclosure relate to a modular drive train to propel a railcar mover in such a manner that gives an operator the ability to precisely control the speed of the each of the rail wheels to enable turning without traditional mechanical linkages or devices to facilitate turning of the vehicle and increase efficiency over conventional drive systems that have rigid axles by reducing the number of drive train components to propel vehicle. By adjusting the speed of individual rail wheels, the railcar mover 10 to be efficiently steered along the railroad tracks.

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Nothing in this specification should be construed as requiring a specific three-dimensional orientation of structures in order to fall within the scope of this invention. In addition, the reader is advised that the attached drawings are not necessarily drawn to scale.

The following terms are used in this specification, and unless otherwise noted or clear from the context, these terms have the meanings provided below.

"Plurality" indicates any number greater than one, either disjunctively or conjunctively, as necessary, up to an infinite number.

"Integral joining technique" or means a technique for joining two pieces so that the two pieces effectively become a single, integral piece, including, but not limited to, irreversible joining techniques, such as welding, brazing, adhesively joining, cementing, or the like, where separation of the joined pieces cannot be accomplished without structural damage thereto. Pieces joined with such a technique are described as "integrally joined."

Figure 1:
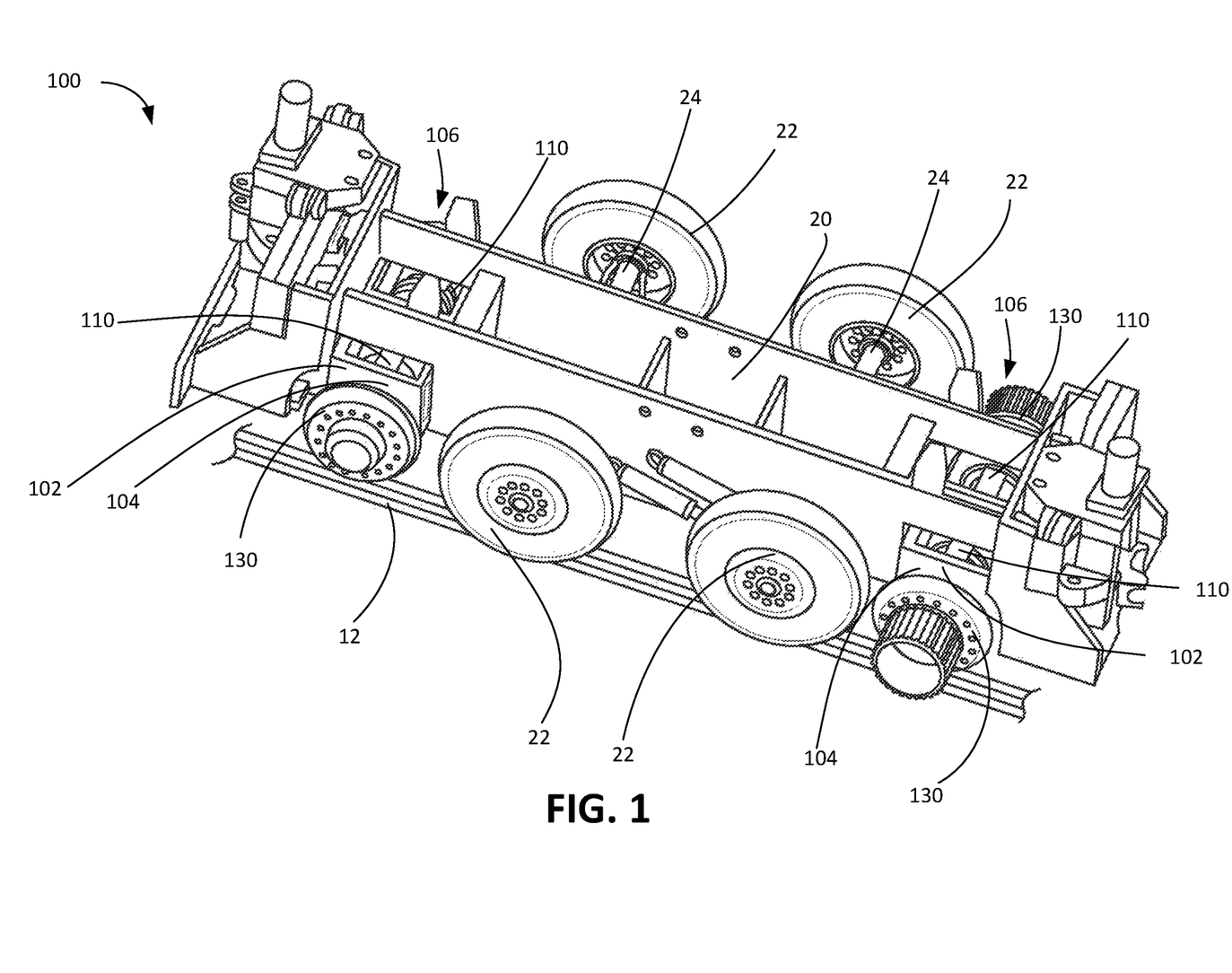
FIG. 1 illustrates an isometric view of a chassis of a railcar mover with a modular drive train with portions removed to show details.
Figure 2:
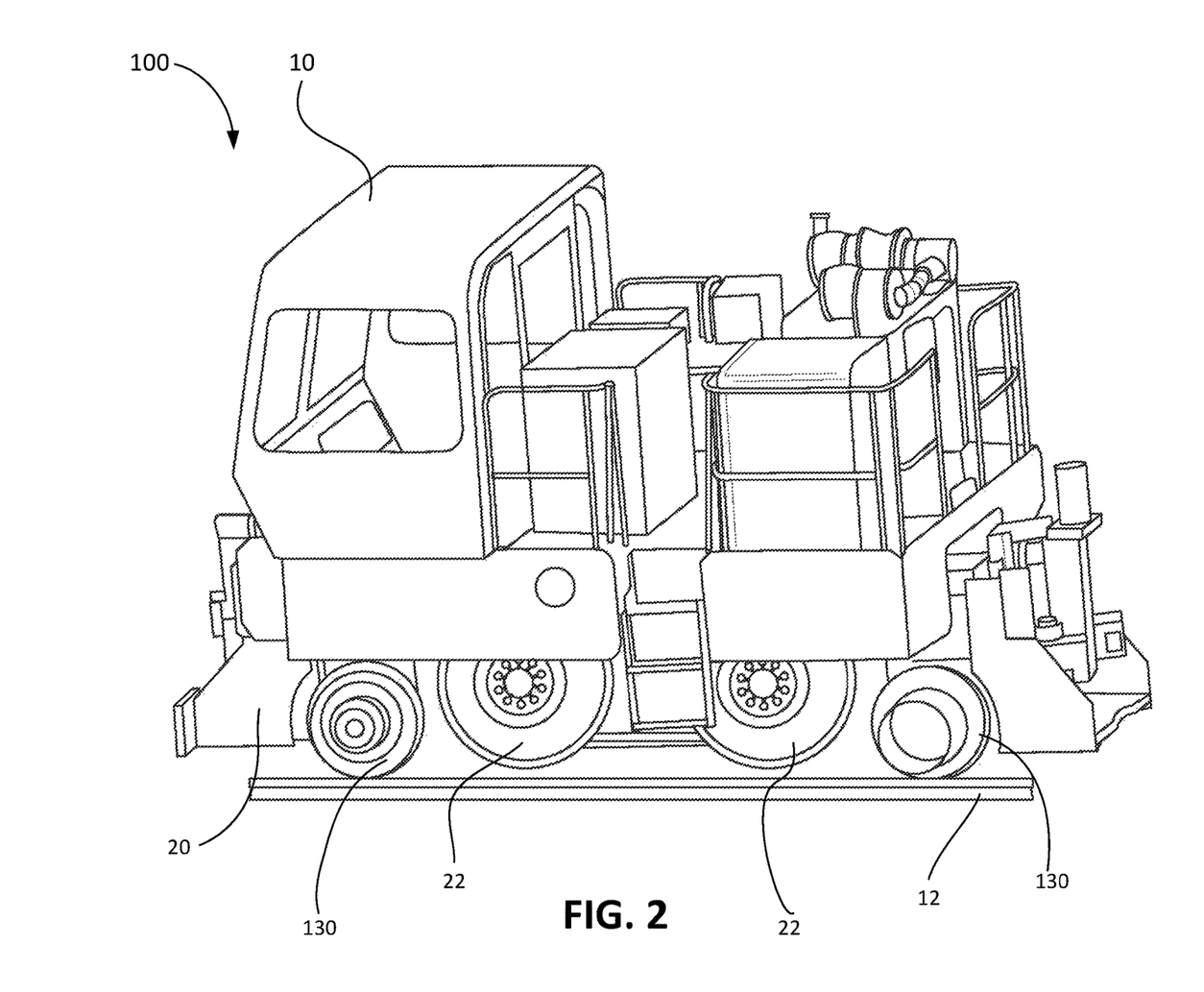
FIG. 2 illustrates an isometric view of an exemplary railcar mover having the chassis of FIG. 1, according to one or more aspects described herein.

FIG. 1 illustrates the vehicle chassis 20 of a railcar mover 10, shown in FIG. 2, with a modular drive train assembly 100. The modular drive train assembly 100 may include four independently controlled electric drive motors 110 with each electric drive motor being connected to one of the four rail wheels 130 of the modular drive train assembly 100. The modular drive train assembly 100 may comprise a pair of electric drive assemblies 102 connected near opposite ends of the chassis 20. Each electric drive assembly 102 may include a first end 104 and a second end 106 opposite the first end 104, and an electric drive motor 110 connected to a gearbox 120, which is further connected to a rail wheel 130 mounted to each end 104, 106 of the electric drive assembly 102. Each electric drive assembly 102 may then be secured to the vehicle chassis 20. The plurality of rail wheels 130 may engage the railroad tracks 12 when the railcar mover 10 is driven along the railroad tracks 12. The railcar mover 10 may also include four road wheels 22 and their associated road wheel drive axle assemblies 24 that are used when the railcar mover 10 is moving along the road or ground and not on the railroad tracks 12.

Figure 3:
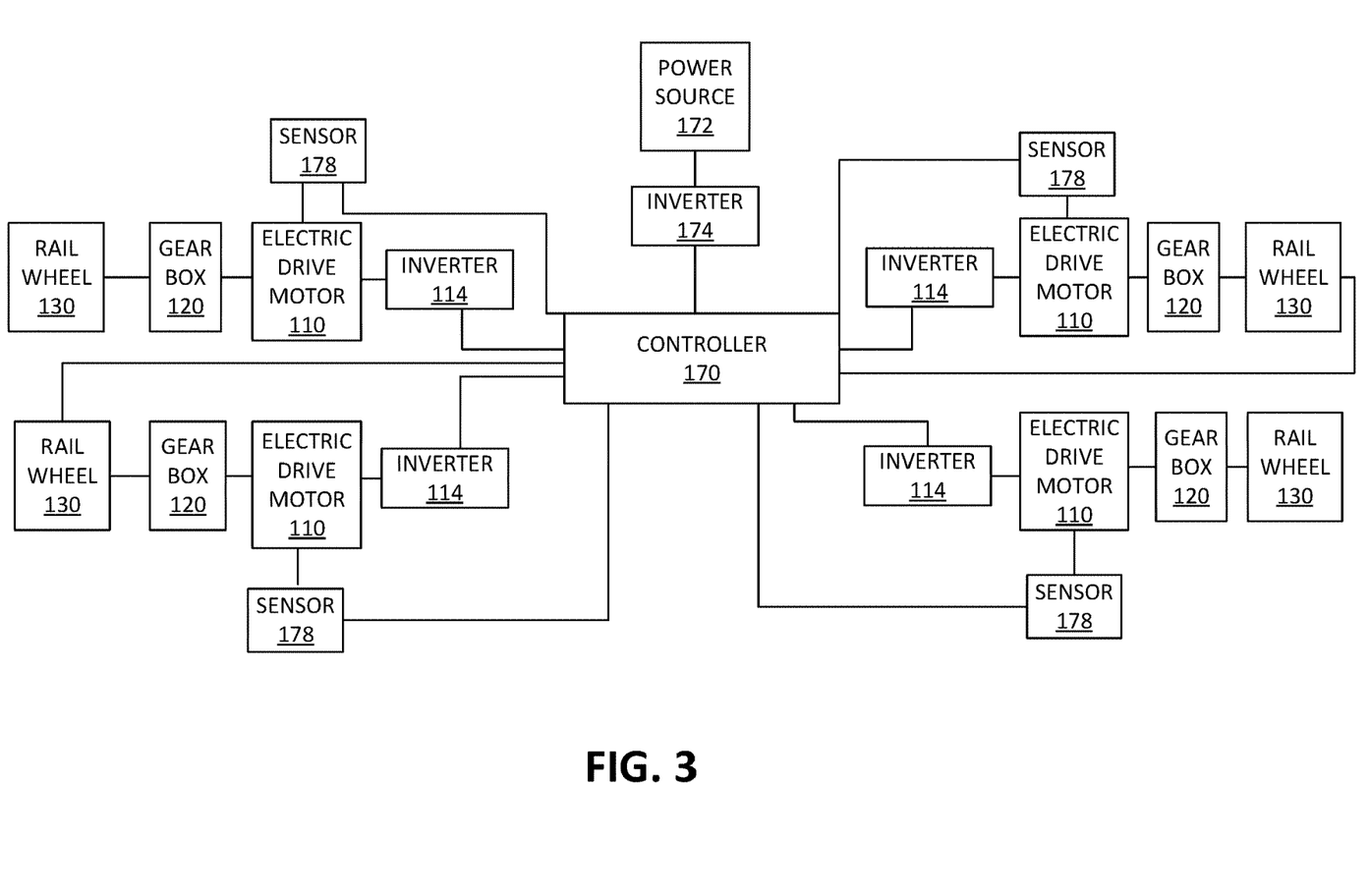
FIG. 3 illustrates a schematic for the modular drive train system for the railcar mover of FIG. 1, according to one or more aspects described herein.

FIG. 3 illustrates a schematic of the modular drive train assembly 100. As shown, a controller 170 may be connected to each electric drive motor 110 to control the speed of each rail wheel 130 independently. The modular drive assembly 100 may have a power source 172 that provides an electric current through the power inverter 174 to the controller 170. The power inverters 114, 174 as described herein convert direct current power to alternating current for use by the electric drive motors 110 and the controller 170. The controller 170 may direct the power from the power source 172 to any or all of the electric drive motors 110. Each electric drive motor 110 may be also connected to a power inverter 114 to ensure the proper current, voltage, and frequency are supplied to each electric drive motor 110. In addition, each electric drive motor 110 may have an axle or drive shaft 112 that rotates and is coupled to a corresponding gearbox 120 to provide the proper torque to rotate the rail wheels 130 accordingly.

The railcar mover 10 may operate having a fully electric mode or as a hybrid vehicle. The power source 172 may provide the necessary power for the modular drive train assembly 100 and may have a different size depending upon the size of the railcar mover 10. The power source 172 may comprise a battery that may be rechargeable, an internal combustion engine coupled to an electric generator, or a combination of both a battery and an electric generator.

The modular drive train system 100 may also have an automated control system 200 to improve the traction of the modular drive train system 100. Each of the electric drive motors 110 may have a sensor 178 connected to monitor a predetermined set of parameters, such as the speed the motor is rotating and the electric current used by the electric drive motor 110, and communicate these parameters to the controller 170. By knowing the speed the electric drive motor 110 is rotating, the controller may be able to calculate the speed the rail wheel 130 is rotating. Using this information, the controller 170 may adjust the electric current being supplied to the electric drive motor 110 to either increase or decrease the speed of the electric drive motor 110. The automated control system 200 further allows each electric drive motor 110 to individually adjust the operating parameters of the electric drive motors 110. For example, the adjustment to the operating parameters may include increasing or decreasing the power, or electric current, to each electric drive motor in order to increase or decrease the acceleration and deceleration rates for the electric drive motors 110, increase or decrease the speed of the electric drive motors 110, and increase or decrease the torque of the electric drive motors 110. This individual control of the amount of power, or electric current supplied to each electric drive motor 110 may provide improved traction control to each of the rail wheels 130 giving the railcar mover 10 improved efficiency when pushing and pulling rail cars. With the precise control of the speed and torque of the electric drive motors 110, the controller 170 may further adjust the operating parameters to handle varying track conditions and optimize the traction of the rail wheels 130 to enhance the overall performance of the vehicle 10. By having independent control of each electric drive motors 110, the overall traction of the vehicle is improved along with making the railcar mover 10 more efficient by reducing the energy losses associated with the loss of traction.

Figure 4:
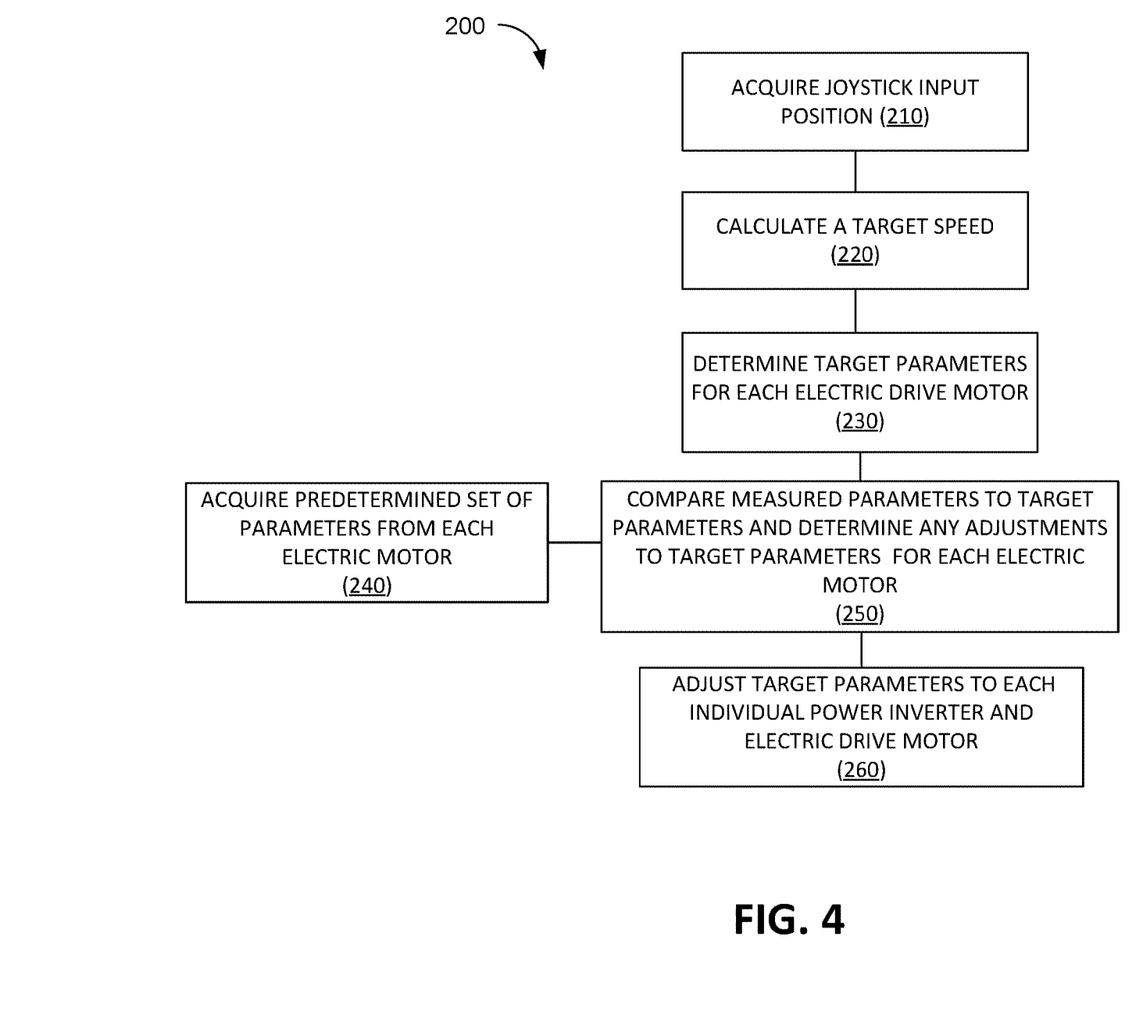
FIG. 4 illustrates a flowchart of the system for controlling the electric drive motors of the modular drive train system of FIG. 1.

The automated control system 200 may function autonomously to adjust the parameters for each of the electric drive motors 110 and therefore not require any operator intervention. The control system 200 may include a non-transitory computer readable medium storing computer readable instructions that, when executed by the controller, may cause the controller to perform a plurality of instructions to manage the electric drive assembly. For example, as shown in FIG. 4, as the operator moves the joystick, or other operator input device, from a neutral position and selects forward or reverse, the railcar mover 10 may be accelerated or decelerated. The movement of the joystick may generate a signal to increase or decrease the speed of the vehicle 10. The controller 170 may acquire the signal from the joystick, (210) and, then calculate target parameters, such as a target speed for the vehicle 10 (220). Then, the controller 170 may determine the appropriate target parameters for the electric drive motors 110, such as the target electric current for each of the electric drive motors 110 to accelerate or decelerate the vehicle 10 to the desired speed (230). The automated control system 200 may comprise a feedback loop to automatically vary the torque and speed of the electric drive motors 110 to allow the railcar mover 10 to efficiently negotiate curves in the track or adjust to varying track conditions. The controller 170 may acquire the predetermined set of measured parameters (240) from the sensors 178 and then compare the predetermined set of measured parameters to the target parameters for each electric drive motor 110 to determine if the power required by the electric driver motors 110 needed to be increased or decreased (250). The controller 170 may then adjust the target operating parameters of the electric drive motors 110, such as to increase or decrease the power to each of the power inverters 114 that are coupled to each electric drive motors 110 (260), from the power inverters 114 the speed and torque of the electric drive motors 110 may be controlled by varying the electric motor input frequency, the current, and the voltage to the electric drive motors 110 to propel the vehicle 10 at a target rate based on the joystick position 210.

As discussed above, the automated control system 200 may independently adjust the power to each of the electric drive motors 110. For example, when the railcar mover 10 is maneuvering along a turn on the rail tracks, the reaction of rail wheels 130 along the inside turning radius may increase resistance causing the electrical current on their corresponding electric drive motors 110 to increase. The controller 170 may acquire the predetermined set of measured parameters from the plurality of sensors 178 such as any increase in electrical current to the electric drive motors 110 connected to the rail wheels 130 along the inside of the turn. The controller 170 may then communicate to decrease the amount of power to the power inverter 114 and thus decrease the speed of electric drive motor 110 to reduce the speed of the inside rail wheels 130 while maintaining the predetermined target speed of the electric drive motors 110 of the outside rail wheels 130. The reduction in power sent to the rail wheel 130 along the inside of the turn causes the rail wheel 130 along the inside of the turn to rotate at a different speed than the rail wheel 130 along the outside of the turn. This reduction in speed helps to improve traction as the rail wheel 130 along the inside of the turn is not trying to rotate too quickly as well as saving energy by providing less current to the electric drive motors 110 for the rail wheels 130 along the inside turn radius. As an alternate means of improving traction, the speed of the rail wheels 130 along the outside turning radius may be increased by increasing the power instead of reducing the amount of power to the rail wheels 130 along the inside turning radius. Thus, in the alternative, the controller 170 may communicate to increase the power to the power inverter 114 and increase the speed of electric drive motor 110 to increase the speed of the outside rail wheels 130 while maintaining the predetermined target speed of the electric drive motors 110 of the rail wheels 130 along the inside rail wheels 130. This independent speed adjustment of each rail wheel 130 provides improved overall traction for the railcar mover 10.

As a further example of the automated control system 200, the controller 170 may acquire a joystick input position, calculate a target speed based upon the joystick input position, determine a target speed, determine a target electric current, or amount of power, for each of the electric drive motors 110, acquire a measured electric current at each of the electric drive motors 110, compare the measured electric current being received at each electric motor to the target amount of power, or target electric current, for each of the electric drive motors 110. Upon determining that the measured electric current is greater than the target electric current for one of the electric drive motors, the controller 170 may reduce the target amount of power, or electric current, for the one of the electric drive motors 110. Alternatively, upon determining that the measured electric current is less than the target electric current for one of the electric drive motors, the controller 170 may increase the target electric current for the one of the electric drive motors 110.

The controller 170 may be a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The one or more implementations described throughout this disclosure may utilize logical blocks, modules, and circuits that may be implemented or performed with a controller 170.

The controller 170 may be used to implement various aspects and features described herein. As such, the controller 170 may be configured to execute multiple calculations, in parallel or serial and may execute coordinate transformations, curve smoothing, noise filtering, outlier removal, amplification, and summation processes, and the like. The controller 170 may include a processing unit and system memory to store and execute software instructions.

In addition, the modular drive train system 100 may also include regenerative braking that can recover some the mechanical energy used in braking and convert it to electrical energy that can be restored to the power source 172. The controller 170 may automatically control the regenerative braking process when operator moves the joystick position to decelerate the railcar mover 10.

Figure 5:
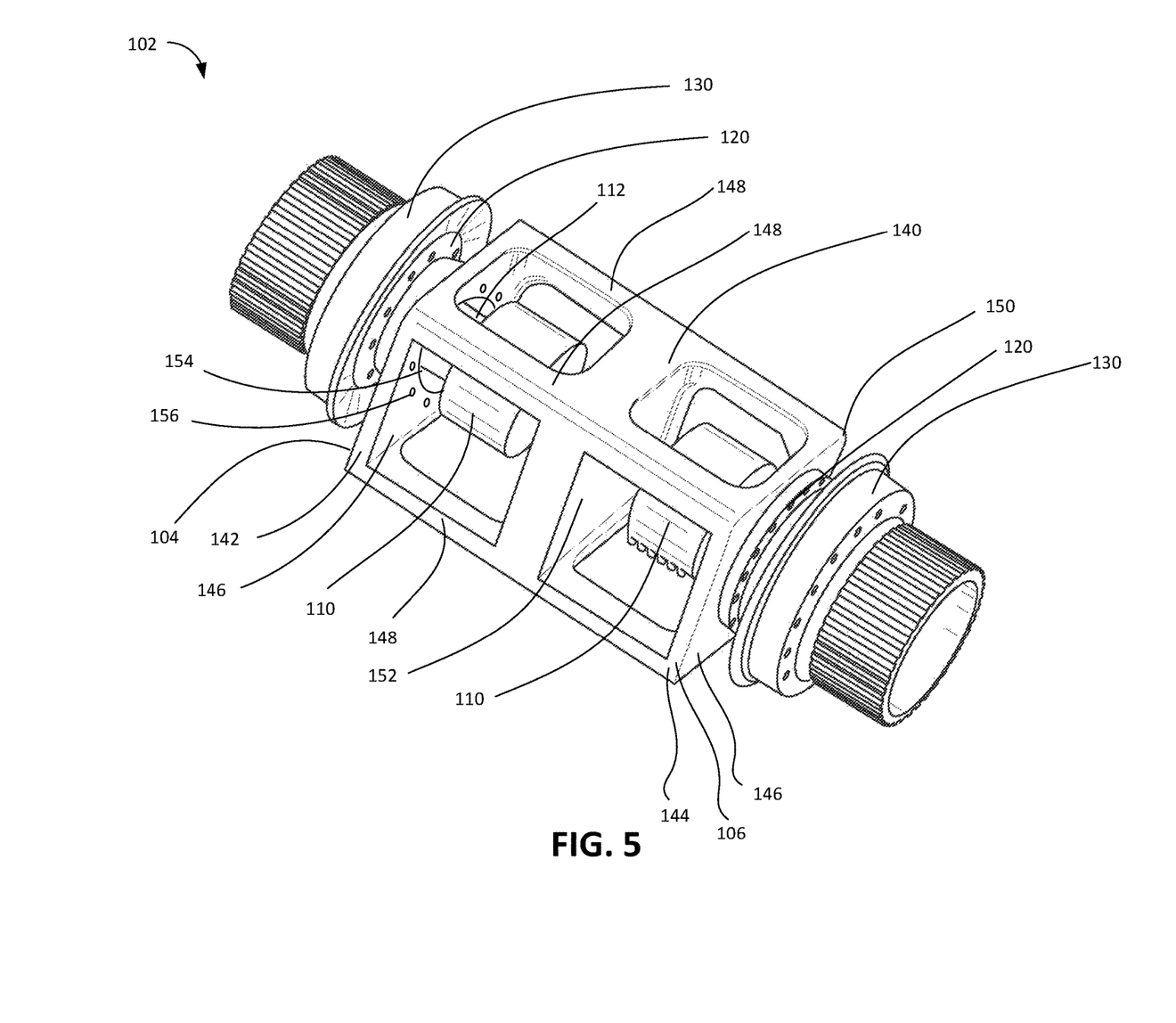
FIG. 5 illustrates an electric drive assembly for the modular drive train as shown in FIG. 1.
Figure 6:
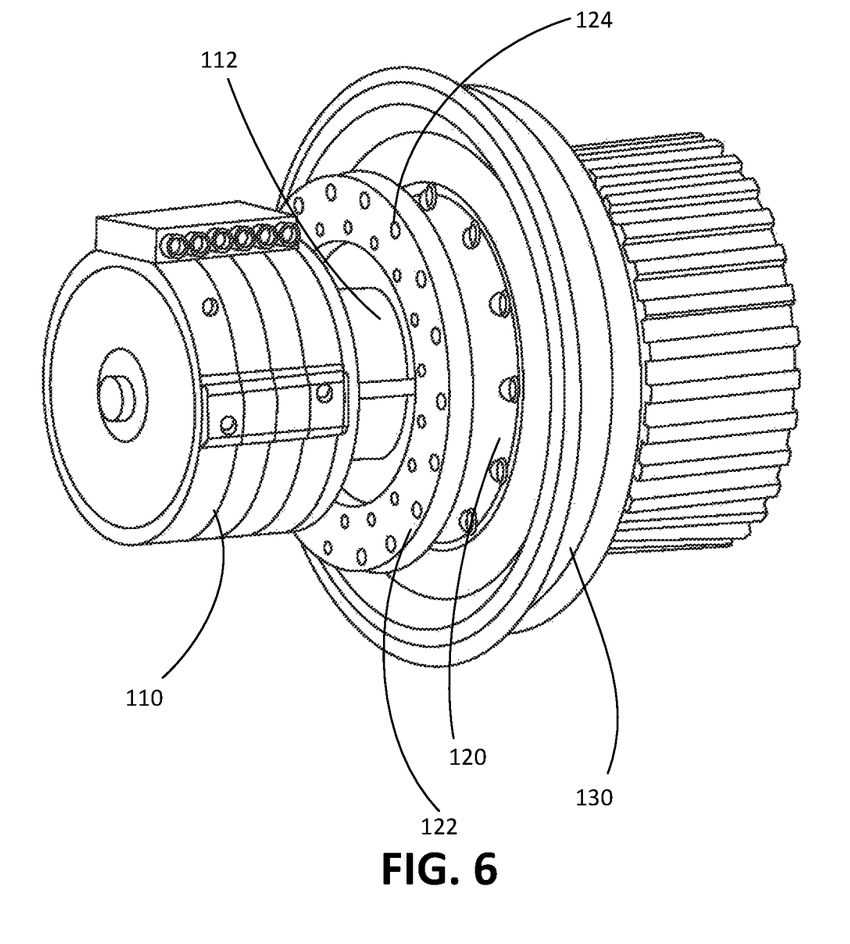
FIG. 6 illustrates an exemplary electric drive sub-assembly of the railcar mover of FIG. 5.

FIG. 5 illustrates a more detailed view of the exemplary electric drive assembly 102. The electric drive assembly 102 may comprise a frame 140 having an electric drive motor 110, gearbox 120 and rail wheel 130 mounted to each end 142, 144. Each rail wheel 130 may be coupled to a gearbox 120, which is then directly coupled to the electric drive motor 110 as shown in FIG. 6. As shown in the exemplary embodiment, each rail wheel 130 has its corresponding gearbox positioned outboard of the mounting plate 146 of the frame 140. Each rail wheel 130 positioned on either side of the frame 140 may be substantially coaxial. Optionally, each rail wheel 130 may be mounted to a rigid axle or independently mounted to the chassis 20 as described above. The majority of each electric drive motor 110 may be positioned inboard of the mounting plate 146 with the portion connecting to the gearbox 120 extending through a central opening 154 of the mounting plate 146. A portion of the electric drive motor 110 such as an axle or drive shaft 112 may extend through the central opening 154. The gearbox 120 may couple to the drive shaft 112 of the electric drive motor 110 and have a mounting ring 122 with a plurality of mounting holes 124 that secures to the mounting plate 146 using mechanical fasteners or some other type of releasable connection, so the electric drive motor 110, gearbox 120 or other components may be removed for repair or replacement. A portion of the gearbox 120 may be positioned within the inner diameter of the rail wheel 130.

Each electric drive motor 110 may have a drive shaft or axle 112 that couples to the gearbox 120. Additionally, each electric drive motor 110 may be powered by either an alternating current (AC) or direct current (DC). In the exemplary embodiment, the electric drive motor 110 is powered from an alternating current that is created by the power inverter 114 based off a power source 172 that provide direct current. The size of each of the electric drive motors 110 may be determined based upon the size of the railcar mover 10 upon which they are mounted. The railcar movers may vary in weight from approximately 9070 kilograms to approximately 45,360 kilograms. As such, the plurality of electric drive motors 110 each may be capable of providing within a range of 15 kilowatts to 80 kilowatts of power. For example, a railcar mover 10 with an estimated vehicle weight of approximately 36,290 kilograms may require a total power requirement for the modular drive train assembly 100 of approximately 186.4 kilowatts, which would equate to each electric drive motor 110 capable of supplying at least 46.6 kilowatts of power.

Each gearbox 120 may have a mounting ring 122 with a plurality of mounting holes 124. In addition, each gearbox 120 may have a gear ratio necessary to provide the desired amount of torque depending upon the size of the electric drive motor 110. Each gearbox may have a gearbox ratio within a range of approximately 15:1 to approximately 70:1. For example, for the exemplary railcar vehicle 10 described above having an estimated vehicle weight of approximately 36,290 kilograms, the gearbox ratio may be approximately 29.86:1 when coupled with an electric drive motor providing 46.6 kilowatts of power. While any type of gearbox 120 may be used to transfer the power and the proper torque from the electric drive motor 110 to the rail wheel 130, the gearbox 120 may comprise a planetary-type gearbox as shown in the exemplary embodiment because of its compact size and relatively low weight.

Each power inverter 114, 174 may convert the power from the power source 172 from a direct current to an alternating current to provide the correct output voltage and frequency to the electric drive motors and any other electrical components such as the controller 170. The power inverters 114 may be sized for the electric drive motors 110 used on the vehicle. In addition, the power inverters 114 may be located adjacent to or attached to the electric drive motors 110. Alternatively, the power inverters 114 may be mounted away from the electric drive motors 110.

The frame 140 may have a first end 142, a second end 144 with each end having a mounting plate 146. A plurality of support beams 148 may extend from the mounting plate 146 at the first end 142 and the mounting plate 146 at the second end 144. The support beams 148 may connect to at least a portion of an exterior edge 150 of each of the mounting plates 146. The frame 140 may further have a rib 152 connecting between the support beams 148 to provide additional structural support for the frame 140. Each mounting plate 146 may have a central opening 154 along with a plurality of mounting holes 156 to secure each of the electric drive motors 110, the gearboxes 120, and rail wheels 130.

The frame 140 may be a metallic material such as a steel alloy or similar material. The frame 140 may be formed as a unitary component by a casting or machining process or may be formed from a plurality of separate components that are connected and then integrally joined together, by a welding or other similar process.

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure. Thus, the spirit and scope of the invention should be construed broadly as set forth in the appended claims.

We claim:

1. A railcar mover comprising:
   a vehicle chassis;
   an electric drive assembly comprising:

a frame secured to the vehicle chassis, wherein the frame includes a first end having a first mounting plate and a second end opposite the first end having a second mounting plate, with frame support beams extending between the first end and the second end of the frame, and wherein the first mounting plate has a first plurality of mounting holes located in between the frame support beams and a first central opening of the first mounting plate and the second mounting plate has a second plurality of mounting holes located in between the frame support beams and a second central opening of the second mounting plate;

a first electric drive motor connected to a first gearbox that is connected to a first rail wheel, wherein the first rail wheel is positioned outboard the first mounting plate of the frame, and wherein the first gearbox has a first mounting ring with a third plurality of mounting holes, wherein the first mounting ring is connected to the first mounting plate;

a second electric drive motor connected to a second gearbox that is connected to a second rail wheel, wherein the second rail wheel is positioned outboard of the second mounting plate of the frame, and wherein the second gearbox has a second mounting ring with a fourth plurality of mounting holes, wherein the second mounting ring is connected to the second mounting plate; and wherein the second rail wheel is substantially coaxial to the first rail wheel;

wherein the first electric drive motor and the second electric drive motor are connected to a power source, and wherein a first amount of power supplied to the first electric drive motor and a second amount of power supplied to the second electric drive motor are independently controlled such that the first amount of power is different than the second amount of power.

2. The railcar mover of claim 1, wherein a difference in the first amount of power and the second amount of power causes the first rail wheel to rotate at a different speed than the second rail wheel.

3. The railcar mover of claim 1, wherein at least a portion of the first electric drive motor is located inboard the first mounting plate of the frame and at least a portion of the second electric drive motor is located inboard of the second mounting plate of the frame.

4. The railcar mover of claim 1, wherein at least a portion of the first electric drive motor extends through the first central opening in the first mounting plate of the frame and at least a portion of the second electric drive motor extends through the second central opening in the second mounting plate of the frame.

5. The railcar mover of claim 1, wherein a portion of the first gearbox is located within an inner diameter of the first rail wheel.

6. The railcar mover of claim 1, wherein the first gearbox and the second gearbox are planetary-type gearboxes.

7. The railcar mover of claim 1, further comprising:

a controller connected to the power source, wherein the controller determines the first amount of power provided to the first electric drive motor and the second amount of power to the second electric drive motor; and wherein when the railcar mover is maneuvering along a turn on a track, the first rail wheel being located along an inside of the turn and the second rail wheel being located along an outside of the turn, the controller decreases the first amount of power to the first electric drive motor and keeps the second amount of power the same to the second electric drive motor such that the first amount of power is less than the second amount of power.

8. The railcar mover of claim 7, wherein a first sensor monitors and communicates a first measured electric current in the first electric drive motor to the controller, and wherein a second sensor monitors and communicates a second measured electric current in the second electric drive motor to the controller.

9. A railcar mover comprising:

a vehicle chassis;

a first electric drive assembly comprising:

a first frame secured to the vehicle chassis, wherein the first frame includes a first end having a first mounting plate and a second end opposite the first end having a second mounting plate, with frame support beams extending between the first end and the second end of the first frame, wherein the first mounting plate has a first plurality of mounting holes located in between the frame support beams of the first frame and a first central opening on the first mounting plate and the second mounting plate has a second plurality of mounting holes located in between the frame support beams and a second central opening on the second mounting plate;

a first electric drive motor connected to a first gearbox that is connected to a first rail wheel, wherein the first rail wheel is positioned outboard the first mounting plate of the first frame, and wherein the first gearbox has a first mounting ring with a third plurality of mounting holes, wherein the first mounting ring is connected to the first mounting plate;

a second electric drive motor connected to a second gearbox that is connected to a second rail wheel, wherein the second rail wheel is positioned outboard of the second mounting plate of the first frame, and wherein the second gearbox has a second mounting ring with a fourth plurality of mounting holes, wherein the second mounting ring is connected to the second mounting plate; wherein the second rail wheel is substantially coaxial to the first rail wheel, and a second electric drive assembly comprising:

a second frame secured to the vehicle chassis, wherein the second frame includes a first end having a third mounting plate and a second end opposite the first end having a fourth mounting plate, with frame support beams extending between the first end and the second end of the second frame, and wherein the third mounting plate has a fifth plurality of mounting holes located in between the frame support beams of the second frame and a third central opening of the third mounting plate and the fourth mounting plate has a sixth plurality of mounting holes located in between the frame support beams of the second frame and a fourth central opening of the fourth mounting plate;

a third electric drive motor connected to a third gearbox that is connected to a third rail wheel, wherein the third rail wheel is positioned outboard the first mounting plate of the second frame, and wherein the third gearbox has a third mounting ring with a seventh plurality of mounting holes, wherein the third mounting ring is connected to the third mounting plate; and a fourth electric drive motor connected to a fourth gearbox that is connected to a fourth rail wheel, wherein the fourth rail wheel is positioned outboard of the second mounting plate of the second frame, wherein the fourth rail wheel is substantially coaxial to the third rail wheel, and wherein the fourth gearbox has a fourth mounting ring with an eighth plurality of mounting holes, wherein the fourth mounting ring is connected to the fourth mounting plate.

10. The railcar mover of claim 9, further comprising:
a controller connected to a power source, wherein the controller determines a first amount of power provided to the first electric drive motor and a second amount of power provided to a second electric drive motor;
wherein a first sensor monitors and communicates a first set of predetermined measured parameters at the first electric drive motor to the controller, wherein the first set of predetermined measured parameters includes a first measured electric current in the first electric drive motor;
wherein a second sensor monitors and communicates a second set of predetermined measured parameters at the second electric drive motor to the controller, and wherein the second set of predetermined measured parameters includes a second measured electric current in the second electric drive motor; and
wherein when the railcar mover is maneuvering along a turn on a track, the first rail wheel being located along an inside of the turn and the second rail wheel being located along an outside of the turn, the controller increases the first amount of power to the second electric drive motor and keeps the first amount of power the same to the first electric drive motor such that the second amount of power is greater than the first amount of power.

11. The railcar mover of claim 10, wherein a third electric current supplied from the power source to the third electric drive motor is different than a fourth electric current such that the third rail wheel rotates at a different speed than the fourth rail wheel.

12. The railcar mover of claim 10, further comprising a non-transitory computer readable medium storing computer readable instructions that, when executed by a controller, causes the controller to at least:
acquire a joystick input position,
calculate a target speed based upon the joystick input position,
determine a target electric current for the first electric drive motor and the second electric drive motor,
acquire the first measured electric current at the first electric drive motor and the second measured electric current the second electric drive motor,
compare the first measured electric current to the target electric current for the first electric drive motor; and
compare the second measured electric current to the target electric current for the second electric drive motor.

13. The railcar mover of claim 12, wherein the non-transitory computer readable medium storing computer readable instructions further causes the controller to at least:
upon determining that the first measured electric current is greater than the target electric current for the first electric drive motor,
increase the target electric current for the second electric drive motor.

14. The railcar mover of claim 9, wherein each of the electric drive motors are connected to a power inverter.

15. A railcar mover comprising:
a vehicle chassis;
a first electric drive assembly secured to the vehicle chassis comprising:
a first frame including a first end having a first mounting plate and a second end opposite the first end having a second mounting plate, with frame support beams extending between the first end and the second end of the first frame, wherein the first mounting plate has a first plurality of mounting holes located in between the frame support beams of the first frame and a first central opening on the first mounting plate and the second mounting plate has a second plurality of mounting holes located in between the frame support beams and a second central opening on the second mounting plate;
a first electric drive motor connected to a first gearbox that is connected to a first rail wheel, wherein the first rail wheel is positioned outboard the first mounting plate of the first frame, and wherein the first gearbox has a first mounting ring with a third plurality of mounting holes, wherein the first mounting ring is connected to the first mounting plate;
a second electric drive motor connected to a second gearbox that is connected to a second rail wheel, wherein the second rail wheel is positioned outboard of the second mounting plate of the first frame, and wherein the second mounting plate has a second plurality of mounting holes located in between the frame support beams and a second central opening on the second mounting plate; wherein the second rail wheel is substantially coaxial to the first rail wheel, a second electric drive assembly secured to the vehicle chassis comprising:
a second frame including a first end having a third mounting plate and a second end opposite the first end having a fourth mounting plate, with frame support beams extending between the first end and the second end of the second frame, and wherein the third mounting plate has a fifth plurality of mounting holes located in between the frame support beams of the second frame and a third central opening of the third mounting plate and the fourth mounting plate has a sixth plurality of mounting holes located in between the frame support beams of the second frame and a fourth central opening of the fourth mounting plate;
a third electric drive motor connected to a third gearbox that is connected to a third rail wheel, wherein the third rail wheel is positioned outboard the first mounting plate of the second frame, and wherein the third gearbox has a third mounting ring with a seventh plurality of mounting holes, wherein the third mounting ring is connected to the third mounting plate;
a fourth electric drive motor connected to a fourth gearbox that is connected to a fourth rail wheel, wherein the fourth rail wheel is positioned outboard of the second mounting plate of the second frame, and wherein the fourth gearbox has a fourth mounting ring with an eighth plurality of mounting holes, wherein the fourth mounting ring is connected to the fourth mounting plate; wherein the fourth rail wheel is substantially coaxial to the third rail wheel; and
a non-transitory computer readable medium storing computer readable instructions that, when executed by a controller, causes the controller to at least:
acquire a joystick input position,
calculate a target speed based upon the joystick input position,
determine a target electric current for each electric drive motor,
acquire a measured amount of electric current at the first electric drive motor and the second electric drive motor, compare the measured amount of electric current at the first electric drive motor to the target electric current for the first electric drive motor, wherein when the railcar mover is maneuvering along a turn on a track, the first rail wheel being located along an inside of the turn and the second rail wheel being located along an outside of the turn, the controller decreases the target electric current for the first electric drive motor while keeping the target electric current the same for the second electric drive motor.

16. The railcar mover of claim 15, wherein at least a portion of the first electric drive motor extends through the first central opening in the first mounting plate of the first frame and at least a portion of the second electric drive motor extends through the second central opening in the second mounting plate of the first frame.

* * * * *